(12) United States Patent
Lee et al.

(10) Patent No.: US 6,610,944 B2
(45) Date of Patent: Aug. 26, 2003

(54) KEYBOARD WITH DRAINING UNIT AND NOTEBOOK COMPUTER HAVING THE KEYBOARD

(75) Inventors: Seong-Ho Lee, Anyang (KR); Dong-Joon Choi, Seongnam (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/238,589

(22) Filed: Sep. 11, 2002

(65) Prior Publication Data

US 2003/0057076 A1 Mar. 27, 2003

(30) Foreign Application Priority Data

Sep. 22, 2001 (KR) ........................................ 2001/58872

(51) Int. Cl.[7] ................................................ H01H 9/04
(52) U.S. Cl. ................................ 200/302.1; 200/302.2; 400/496; 400/490
(58) Field of Search .......................... 200/302.1, 302.2, 200/512, 314; 400/472, 490, 495, 496

(56) References Cited

U.S. PATENT DOCUMENTS

| | | | |
|---|---|---|---|
| 4,948,281 A | | 8/1990 | Werner |
| 5,117,074 A | * | 5/1992 | Yanai et al. ............. 200/302.3 |
| 5,300,742 A | | 4/1994 | Huang |
| 5,421,659 A | * | 6/1995 | Liang ......................... 400/472 |
| 5,642,950 A | | 7/1997 | Hochgesang et al. |
| 5,810,491 A | * | 9/1998 | Muller et al. ............... 400/496 |
| 6,054,939 A | * | 4/2000 | Wei et al. ...................... 341/20 |
| 6,156,983 A | | 12/2000 | Chen et al. |
| 6,443,644 B1 | * | 9/2002 | Takeda et al. .............. 400/490 |

* cited by examiner

*Primary Examiner*—Elvin Enad
*Assistant Examiner*—K. Lee
(74) *Attorney, Agent, or Firm*—Fleshner & Kim, LLP

(57) ABSTRACT

A notebook computer has a main body with a keyboard assembly that includes a base plate mounting a plurality of key buttons and a draining system for draining liquid permeated between the key buttons. The main body further includes a deck plate coupled to a lower plate that forms the main body. The deck plate includes a support portion for the keyboard assembly and a second draining system coupled to a first draining system that drains the keyboard assembly. The lower plate includes a third draining system coupled to the second draining system that includes an access button for securing a storage space in the main body. The access button and the storage space are accessible through a bottom surface of the lower plate. The access button is preferably mechanical. The portable computer reduces or prevents the liquid impinging the keyboard assembly from being introduced into the main body and reduces damage to a main circuit board or the like in the main body.

20 Claims, 3 Drawing Sheets

KEYBOARD WITH DRAINING UNIT AND NOTEBOOK COMPUTER HAVING THE KEYBOARD

BACKGROUND OF THE INVENTION

1. Field of the Invention

The present invention relates to a portable computer, and more particularly, to a keyboard with a draining structure that is capable of preventing various circuit parts from being damaged by draining a liquid that may drop on a keyboard to outside the portable computer.

2. Background of the Related Art

With the development and progress of the computer and Internet technology, computer instruments and communication instruments, computer use is rapidly increasing. Computers can be classified into a desk-top computer that is used in one location such as on a desk at home or in an office, and a notebook (portable or lap-top) computer that is portable and can be used while traveling. The notebook computer is small in volume and easily portable, and since a battery is included, the notebook computer can be used while traveling or even in an area where no external power source is supplied. Especially, for the portable computer, as the capacity is increased and a wireless communication is available in line with the development of technology, more portable computer users are generated.

In the related art notebook computer, a keyboard for inputting various information is installed at a deck case of the main body. A main board mounting various electronic circuit parts is installed inside the main body. An LCD for displaying various information is mounted in a cover that is hinged to be opened and closed at the main body. Since the keyboard is mounted at the main body of the notebook computer, the user may inadvertently spill a drink or coffee over the keyboard or a liquid or a foreign material may be introduced from an external source to the keyboard when operated with a soft drink or outdoors. Once the liquefied material flows into the keyboard, it spreads into the main body through the deck case, causing a problem of damage to various circuit parts mounted at the main board.

Techniques for preventing permeation of liquid into the keyboard have been developed. For example, in U.S. Pat. No. 5,642,950 and U.S. Pat. No. 5,300,742 to prevent permeation of liquid, a rubber material with a good elasticity is sealed wholly or partially.

However, in the related arts, a high-priced material with a good elasticity should be used to assemble a keyboard, and an additional complicated sealing method is required for a fabrication process, which results in at least a problem that the keyboard production cost is increased. Further, friction fatigue and elastic fatigue of the sealing material according to the operation of a key button can occur so that there is a limited endurance period for a waterproof function. Thus, if the user spills a drink over the notebook computer in reliance on the waterproof function without recognizing a bad sealing state caused by such friction fatigue or the like and takes no steps for it, the notebook computer may be seriously damaged.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a portable computer having a draining unit that is capable of draining liquid or a foreign material introduced into a keyboard outside a main body of the portable computer.

Another object of the present invention is to provide a portable computer with a draining structure that drains liquid permeated between key buttons on the keyboard before it reaches a printed circuit or the main board of the portable computer.

Another object of the present invention is to provide a portable computer with a draining structure that can reduce costs.

Another object of the present invention is to provide a portable computer with a draining structure that reduces use of a sealing material.

Another object of the present invention is to provide a portable computer with a draining structure that simplifies a fabrication process by omitting a complicated sealing step.

Another object of the present invention is to provide a notebook computer having a keyboard that can be fabricated with limited endurance for friction fatigue and elastic fatigue of a sealing material.

Another object of the present invention is to provide a keyboard having a draining unit that is capable of draining liquid or a foreign material unnecessarily introduced into a keyboard through a main body of a notebook computer to prevent introduction of the liquid or the foreign material into the main body.

Another object of the present invention is to provide a portable computer with a draining structure that drains through a fastening mechanism that is accessible from a bottom surface of the portable computer.

Another object of the present invention is to provide a portable computer with a draining structure that drains through a mechanical switch used to close a battery compartment or the like that is accessible from a bottom surface of the portable computer.

To achieve at least these and other advantages in a whole or in part, and in accordance with the purpose of the present invention, as embodied and broadly described herein, there is provided a notebook computer that includes a keyboard assembly, wherein the keyboard assembly includes a base plate, a plurality of key buttons disposed on the base plate, and a draining unit that drains a liquid permeated between the key buttons collected by the base plate through a first discharge hole, and a main body that mounts the keyboard assembly, wherein the main body includes a deck case that mounts the keyboard, wherein the deck case includes a guide channel that corresponds to the first discharge hole, wherein the guide channel includes a second discharge hole for discharging the liquid received through the first discharge hole, a lower case coupled to the deck case to form the main body enclosing a prescribed space, wherein the lower case discharges the liquid drained through the second discharge hole, and a mechanical switch to access a prescribed storage area in the lower case of the main body that is accessible through a bottom surface of the main body, wherein the mechanical switch corresponds to the second discharge hole and includes a third discharge hole that accesses outside the main body to pass the liquid outside the main body.

To further achieve at least these and other advantages in a whole or in part, and in accordance with the purpose of the present invention, as embodied and broadly described herein, there is provided a portable computer that includes a body module, a cover rotatably attached to the body module, wherein the cover contains a display unit for viewing information processed by the portable computer, a keyboard assembly mounted on the body module, wherein the keyboard assembly includes a base plate, a plurality of key buttons disposed on the base plate, and a draining unit that drains liquid permeated between the key buttons collected by the base plate through a first discharge hole, a guide channel within the body module that corresponds to the first discharge hole, wherein the guide channel horizontally transports the liquid in the body module and includes a second discharge hole that discharges the liquid drained through the first discharge hole, and a switch device for accessing a prescribed area in the body module that is accessible through a bottom surface of the body module, wherein the switch device corresponds to the second discharge hole and includes a third discharge hole that accesses outside the body module to pass the liquid outside the body module, wherein the switch device includes button device for retractably accessing the prescribed area, and button mounting device that receives the button device, wherein the third discharge hole is formed in the button mounting device to access outside the body module.

To further achieve at least these and other advantages in a whole or in part, and in accordance with the purpose of the present invention, as embodied and broadly described herein, there is provided a portable computer that includes a body module, a cover rotatably attached to the body module, wherein the cover contains a display unit for viewing information processed by the portable computer, a keyboard assembly mounted on the body module, wherein the keyboard assembly includes a plurality of key buttons, and a draining unit that collects and drains liquid permeated between the key buttons through a first discharge hole, and a fastener that accesses a prescribed area in the body module that is accessible through a bottom surface of the body module, wherein the fastener corresponds to the first discharge hole and includes a second discharge hole that accesses outside the body module to pass the liquid outside the body module.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
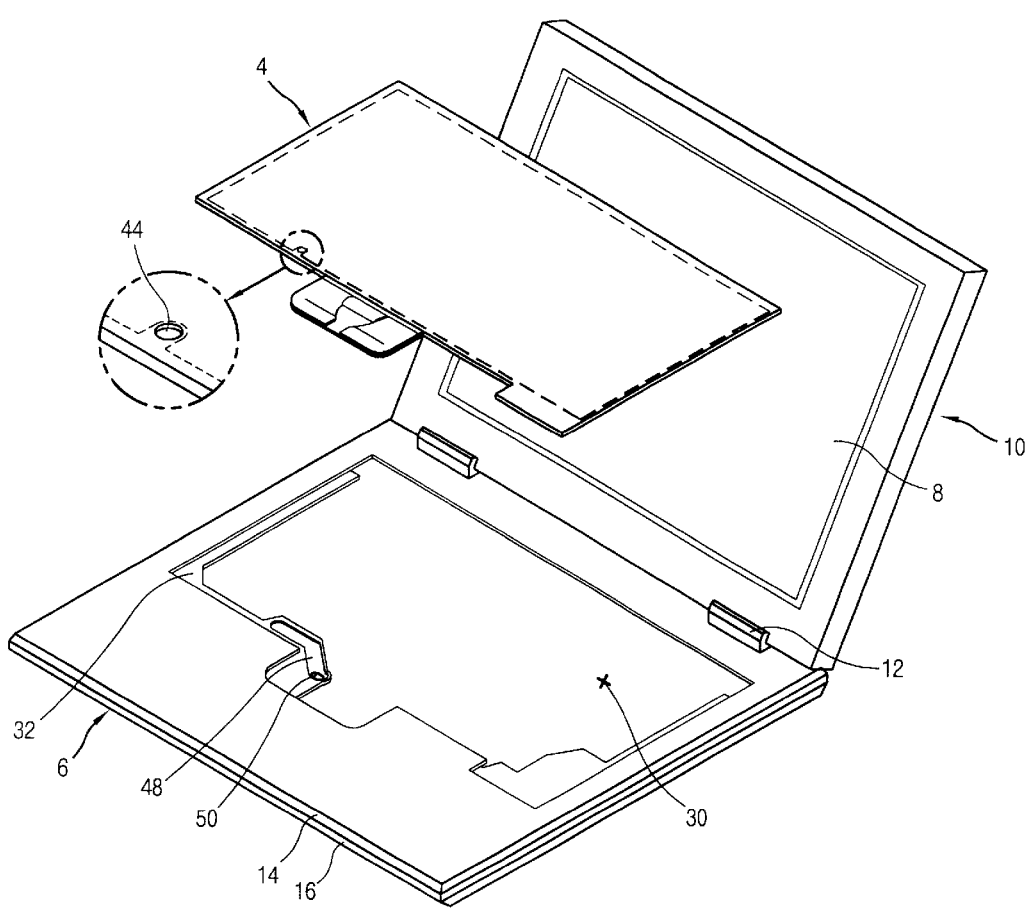
FIG. 1 is a diagram that shows a perspective view of an exploded state of a main body and keyboard of a notebook computer in accordance with a preferred embodiment of the present invention.
Figure 2:
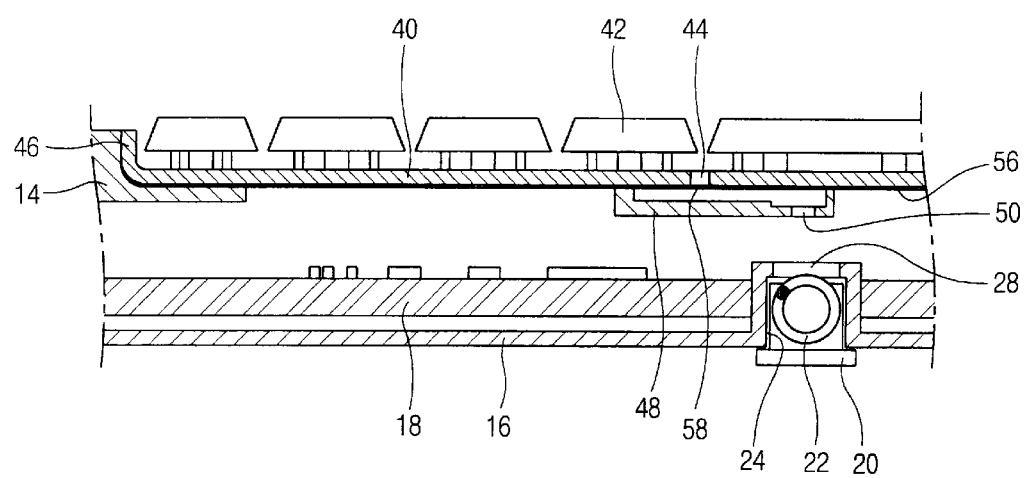
FIG. 2 is a diagram that shows a sectional view of a keyboard and a main body of a notebook computer in accordance with a preferred embodiment of the present invention.

FIG. 1 is a diagram that shows a perspective view of an exploded state of a main body and keyboard of a portable computer in accordance with a preferred embodiment of the present invention. FIG. 2 is a diagram that shows a cross-sectional view of a combination of a keyboard and a main body of the portable computer of FIG. 1.

As shown in FIG. 1, a notebook computer of the present invention includes a main body 6 having a keyboard 4 for inputting various information, and a cover 10 hinged to be opened and closed at the main body 6. The cover 10 includes an LCD 8 for displaying various information of the notebook computer.

The keyboard 4 includes a base plate 40 mounted at a front side of the main body 6, and a plurality of key buttons 42 mounted at an upper surface of the base plate 40 as shown in FIG. 2. At one side of the base plate, a draining hole 44 is formed to discharge liquid or a foreign material introduced to an upper surface of the base plate 40. The draining hole 44 is penetratingly formed preferably at an edge portion of the front side of the base plate 40, preferably to drain the liquid or the foreign material flowing to the keyboard 4.

At a marginal portion of the base plate 40, a blocking film 46 is formed to prevent the liquid or the foreign material introduced to the base plate 40 from being leaked through the marginal portion. As shown in FIG. 2, the blocking film 46 preferably forms a lip or raised wall at an edge of the base plate 40. The blocking film 46 can be formed bent with a prescribed height in the upward direction at the marginal portion of the base plate 40 so that the liquefied material introduced to the base plate 40 is prevented from flowing into the main body 5 through a gap around the marginal portion of the base plate 40. Thus, liquid is prevented or reduced from spilling into a gap between the keyboard 4 and a deck case 14.

The main body 6 includes the deck case 14 and a bottom case 16 that mutually assembled together to form a certain enclosed space. The keyboard 4 is mounted on or in the deck case 14, and a main board 18 is installed inside the main body 6. The main board 18 mounts various electronic circuit parts such as a CPU for processing various information, a hard disk and a LAN card or a memory card as would be known to one of ordinary skill in the art.

A battery (not shown) for supplying power to the portable computer is detachably combined to the main body 6 at the lower case 16. That is, an operation button 20 is mounted at one side of the bottom case 16 to lock or unlock the battery, and a spring 22 is preferably mounted at one side of the operation button 20 to allow an elastic force to the operation button 20. Accordingly, the operation button 20 is preferably a mechanical device.

A mounting unit 24 is formed bent concave in an upward direction from the bottom of the lower case 16, in which the operation button 20 is mounted, and a through hole 28 is formed inside the mounting unit 24.

Figure 3:
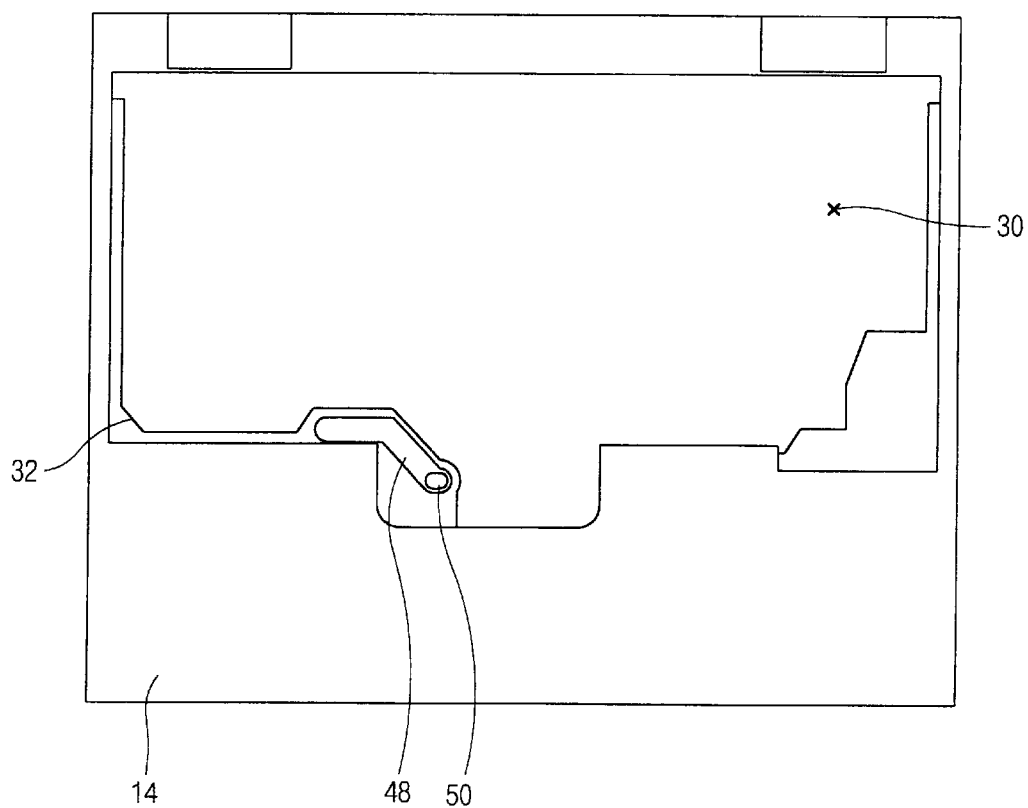
FIG. 3 is a diagram that shows a front view of a deck case of the notebook computer in accordance with a preferred embodiment of the present invention.

A certain space 30 is prepared at the deck case 14, for installing the keyboard 4, and a support portion 32 is protrusively formed in an inward direction at the side of the space 30 to support the base plate 40 of the keyboard 4 inserted in the space 30 as shown in FIG. 3. Thus, the keyboard 4 rests or is fixedly installed to the deck case 14.

A draining part 48 is preferably correspondingly formed at one side of the deck case 14 to outwardly discharge the liquid or the foreign material discharged through the draining hole 44 of the keyboard. The draining part 48 is formed concave on the upper surface of the support portion 32 and has a first end into which the liquid or the foreign material is preferably introduced after being discharged from the draining hole 44 of the keyboard 4. A discharge hole 50 is formed at the other end of the draining part 48 to discharge the liquid or the foreign material introduced into the draining part 48 of the main body 6 downwardly from the keyboard 4. Preferably, the draining part 48 has a connecting portion with a prescribed shape and a downward slope channeling the liquid or the foreign material from the first end to the discharge hole 50.

The discharge hole 50 is preferably positioned above or at an upper side of the through hole 28 formed at the mounting unit 24 where the operation button 20 is mounted to lock or unlock the battery. Thus, the liquid discharged through the discharge hole 50 can be preferably discharged outwardly through the through hole 28 and out of the main body 6.

A waterproof sheet 56 is preferably formed between the base plate 40 and the deck case 14. The waterproof sheet 56 can reduce or prevent the liquid or the foreign material introduced to the upper surface of the base plate 40 from flowing into the main body through the gap between the base plate 40 and the deck case 14 and also reduce or prevent the lower surface of the base plate 40 from being corroded.

The waterproof sheet 56 preferably is a thin plate type that can be attached at the lower surface of the base plate 40 to make it waterproof in operation. The waterproof sheet 56 can be made of any waterproof material.

Preferably, the waterproof sheet 56 is made of a polycarbonate (PC) material. A hole 58 can correspondingly be formed in the waterproof sheet 56, at the portion of the discharge hole 44 of the base plate 40 through which the liquid is discharged.

As described above and shown in FIGS. 1–3, when the user spills a liquid such as a drink over the keyboard 4 by mistake while using the notebook computer, or when liquid or a foreign material is introduced to the keyboard 4 from an external source such as rain or a fire prevention system while the user is using the notebook computer, the liquid or the foreign material introduced to the base plate 40 of the keyboard 4 is drained to the draining part 48 formed at the deck case 14 through the draining hole 44. The liquid or the foreign material drained to the draining part 48 is outwardly discharged through the discharge hole 50 formed at the draining part 48.

The liquid or the foreign material discharged through the discharge hole 50 of the draining part 48 is discharged downwardly of the notebook computer through the through hole 28 formed at the mounting unit 24 where the operation button 20 for locking or unlocking the battery is mounted.

The space or distance between the discharge hole 50 and the through hole 28 is preferably small so that the liquid or the foreign material discharged through the discharge hole 50 is not introduced into the main body 6. Further, a respective size of the discharge hole 50 and through hole 28 preferably directs the liquid cleanly through to the through hole 28. Further, the operation button 20 or the mounting unit 24 preferably form a recess for collection of the liquid or the foreign material, if necessary, introduced through an upper end of the through hole 28 before dispersion through a bottom end of the through hole 28 that accesses outside the main body 6.

The blocking film 46 is preferably formed with a certain dimension in the upward direction at the marginal portion of the base plate 40 sufficient to prevent or reduce the liquid or the foreign material introduced into the base plate 40 from permeating into the main body 6. Further, the waterproof sheet 56 mounted between the base plate 40 and the deck case 14 prevents permeation of liquid into the gap between the base plate 40 and the deck case 14. Thus, that liquid introduced to the keyboard 4 is prevented from being introduced into the main body 6, and corrosion of the base plate 40 is prevented.

Alternatively, the mounting part 24 and the operation switch 20 can have one or more lower through holes aligned or horizontally offset from the through hole 28 or sized differently from the through hole 28. The lower through hole accesses outside the main body 6 from a recess formed in the operation switch 20 to drain the collected liquid or foreign material received via the through hole 28. In the notebook computer of the present invention, communicating pipes can be installed between the through hole and the draining part and the discharge hole and the draining part.

Further, the main body 6 can be a one piece body that installs the keyboard 4. In this case, the main body 6 and keyboard 4 would house the first, second and third draining parts that can horizontally transport the liquid through and out of the main body 6.

As described above, preferred embodiments of a portable or notebook computer with the keyboard having a draining structure in accordance with the present invention have various advantages. In preferred embodiments of a notebook computer, a through hole is formed at the lower case in a fastener or mechanical switch to discharge the liquid or the foreign material from the notebook computer. In a preferred embodiment of a portable computer, a draining structure can include a draining hole formed at a keyboard to drain liquid or a foreign material introduced into the keyboard, a draining part is formed within a main body to guide then discharge the liquid or the foreign material discharged through the discharge hole and a mechanical switch with a through hole to outwardly transmit the same through a bottom surface of the main body to prevent the liquid or the foreign material from being introduced to cause damage into portions of the main body housing electronics. In a preferred embodiment of the notebook computer, a lower case includes a battery mounting unit for receiving a battery pack, a fixed button mounting groove is formed at the battery mounting unit to receive a fixed button used in receiving the battery pack, and a through hole to outside the lower case is formed at the fixed button mounting groove. Further, preferred embodiments according to the present invention can reduce or avoid high-priced sealing materials and sealing steps in a fabrication process to decrease a production cost.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A notebook computer, comprising:
   a keyboard assembly, wherein the keyboard assembly comprises,
      a base plate,
      a plurality of key buttons disposed on the base plate, and a draining unit that drains a liquid permeated between the key buttons collected by the base plate through a first discharge hole; and a main body that mounts the keyboard assembly, wherein the main body comprises,
- a deck case that mounts the keyboard assembly, wherein the deck case includes a guide channel that corresponds to the first discharge hole, wherein the guide channel includes a second discharge hole for discharging the liquid received through the first discharge hole,
- a lower case coupled to the deck case to form the main body enclosing a prescribed space, wherein the lower case discharges the liquid drained through the second discharge hole, and
- a mechanical switch to access a prescribed storage area in the lower case of the main body that is accessible through a bottom surface of the main body, wherein the mechanical switch corresponds to the second discharge hole and includes a third discharge hole that accesses outside the main body to pass the liquid outside the main body.

2. The notebook computer of claim 1, wherein the switch comprises:
- a fixed button to retractably access the storage area;
- a fixed button mounting groove to receive the fixed button; and
- a through hole formed in the fixed button mounting groove to access outside the main body.

3. The notebook computer of claim 2, wherein the lower case includes a battery mounting unit that receives a battery pack in the storage area.

4. The notebook computer of claim 2, wherein the guide channel comprises:
- a first end into which the liquid is introduced after being discharged from the first discharge hole;
- a second end that contains the second discharge hole; and
- a connecting portion with a prescribed shape that horizontally moves the liquid within the main body by forwarding the liquid from the first end to the second discharge hole.

5. The notebook computer of claim 1, wherein the first draining hole is formed at the base plate, and wherein the draining unit comprises:
- a first draining part that outwardly discharges the liquid drained through the first discharge hole.

6. The notebook computer of claim 5, wherein the first discharge hole is penetratingly formed at a marginal portion of the front side of the base plate.

7. The notebook computer of claim 6, wherein a rim is formed at a marginal circumferential edge of the base plate to prevent leakage of the liquid introduced to an upper surface of the base plate to a marginal portion of the base plate.

8. The notebook computer of claim 6, wherein a waterproof sheet is attached at the lower surface of the base plate, and wherein a hole is formed at the waterproof sheet at a portion of the base plate where the first discharge hole is formed.

9. The notebook computer of claim 8, wherein the waterproof sheet is made of polycarbonate (PC).

10. The notebook computer of claim 1, wherein the guide channel comprises:
- a first end into which the liquid is introduced after being discharged from the first discharge hole;
- a second end that contains the second discharge hole; and
- a connecting portion with a prescribed shape that horizontally moves the liquid within the main body by forwarding the liquid from the first end to the second discharge hole.

11. The notebook computer of claim 10, wherein a support portion is formed at the deck case to supportingly mount the keyboard assembly, and the guide channel is formed vertically lower at one side of the support portion with a downward slope from the first end to the second end.

12. The notebook computer of claim 10, wherein a fourth discharge hole is formed at the mechanical switch that corresponds to the second discharge hole, wherein the liquid that passes through the fourth discharge hole can collect in a recess of the mechanical switch before accessing the third discharge hole.

13. The notebook computer of claim 12, wherein a communicating pipe is installed between the second discharge hole and the fourth discharge hole.

14. A portable computer, comprising:
- a body module;
- a cover rotatably attached to the body module, wherein the cover contains a display unit for viewing information processed by the portable computer;
- a keyboard assembly mounted on the body module, wherein the keyboard assembly comprises,
  - a base plate,
  - a plurality of key buttons disposed on the base plate, and
  - a draining unit that drains liquid permeated between the key buttons collected by the base plate through a first discharge hole;
- a guide channel within the body module that corresponds to the first discharge hole, wherein the guide channel horizontally transports the liquid in the body module and includes a second discharge hole that discharges the liquid drained through the first discharge hole; and
- switch means for accessing a prescribed area in the body module that is accessible through a bottom surface of the body module, wherein the switch means corresponds to the second discharge hole and includes a third discharge hole that accesses outside the body module to pass the liquid outside the body module, wherein the switch means comprises,
  - button means for retractably accessing the prescribed area, and
  - button mounting means that receives the button means, wherein the third discharge hole is formed in the button mounting means to access outside the body module.

15. The portable computer of claim 14, wherein the base plate comprises:
- a rim blocking film that prevents the liquid introduced at an upper surface of the base plate from being discharged to a marginal portion of the base plate;
- a waterproof sheet mounted at a lower surface of the base plate; and
- a hole that communicates with the first discharge hole formed at the waterproof sheet of the keyboard.

16. The portable computer of claim 14, wherein the lower case includes a battery mounting unit for receiving a battery pack in the prescribed area.

17. The portable computer of claim 14, wherein the guide channel comprises:
- a first end into which the liquid is introduced after being discharged from the first discharge hole;
- a second end that contains the second discharge hole; and a connecting portion with a prescribed shape that slopes downward to forward the liquid from the first end to the second discharge hole.

18. A portable computer, comprising:

a body module;

a cover rotatably attached to the body module, wherein the cover contains a display unit for viewing information processed by the portable computer;

a keyboard assembly mounted on the body module, wherein the keyboard assembly comprises,
  a plurality of key buttons, and
  a draining unit that collects and drains liquid permeated between the key buttons through a first discharge hole; and a fastener that accesses a prescribed area in the body module through a bottom surface of the body module, wherein the fastener corresponds to the first discharge hole and includes a second discharge hole that accesses outside the body module to pass the liquid outside the body module.

19. The portable computer of claim 18, wherein the fastener comprises,
  a mechanical switch that accesses the storage area; and
  a holder that receives the mechanical switch, wherein the second discharge hole is formed in at least one of the mechanical switch and the holder to access outside the main body.

20. The portable computer of claim 18, comprising a guide channel within the body module that couples the first and second discharge holes corresponds to the first discharge hole, wherein the guide channel includes a third discharge hole that discharges the liquid drained through the first discharge hole into the third discharge hole.

* * * * *